United States Patent
Wang et al.

(10) Patent No.: US 9,140,578 B2
(45) Date of Patent: Sep. 22, 2015

(54) MEASUREMENT DEVICE

(71) Applicant: INDUSTRIAL TECHNOLOGY RESEARCH INSTITUTE, Chutung, Hsinchu (TW)

(72) Inventors: Deng-Mao Wang, Taoyuan (TW); Chong-Xian Su, Kaohsiung (TW); Chung-Hsien Lin, Zhongli (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 359 days.

(21) Appl. No.: 13/869,597

(22) Filed: Apr. 24, 2013

(65) Prior Publication Data
US 2014/0159708 A1    Jun. 12, 2014

(30) Foreign Application Priority Data
Dec. 6, 2012 (TW) .............................. 101145944 A

(51) Int. Cl.
  G01B 7/14 (2006.01)
  G01D 5/20 (2006.01)
  G01D 5/22 (2006.01)

(52) U.S. Cl.
  CPC ... G01D 5/20 (2013.01); G01D 5/22 (2013.01)

(58) Field of Classification Search
  USPC .............. 324/207.16, 207.17, 207.18, 207.19
  See application file for complete search history.

(56) References Cited

U.S. PATENT DOCUMENTS

| | | | |
|---|---|---|---|
| 869,365 A | | 10/1907 | Hawkins |
| 3,986,380 A | * | 10/1976 | Biggs ................................ 72/76 |
| 4,692,699 A | * | 9/1987 | Brunet et al. ............ 324/207.16 |
| 4,752,732 A | * | 6/1988 | Van Schoiack et al. . 324/207.18 |
| 5,016,343 A | | 5/1991 | Schutts |
| 5,351,388 A | | 10/1994 | Van Den Berg et al. |
| 5,572,119 A | | 11/1996 | Taylor |
| 5,998,988 A | | 12/1999 | Dickmeyer et al. |
| 7,994,781 B2 | | 8/2011 | Goldfine et al. |
| 2004/0011149 A1 | | 1/2004 | Carroll |

(Continued)

FOREIGN PATENT DOCUMENTS

| CN | 1987367 A | 6/2007 |
|---|---|---|
| CN | 101929833 A | 12/2010 |
| CN | 202230044 U | 5/2012 |

(Continued)

OTHER PUBLICATIONS

Chuang, Development of Eddy-current Displacement Sensor and Research on Multi-degrees Displacement Sensing System, Thesis, National Taiwan University, Department of Mechanical Engineering, pp. 1-75 (2002).

(Continued)

*Primary Examiner* — Melissa Koval
*Assistant Examiner* — Daniel Miller
(74) *Attorney, Agent, or Firm* — Muncy, Geissler, Olds & Lowe, P.C.

(57) ABSTRACT

A measurement device is provided. The measurement device comprises a ring-shaped base and multiple sensing elements. The sensing elements are symmetrically disposed on the ring-shaped base. Each sensing element comprises a circumferential groove, an axial groove and a coil. The axial groove is connected to the circumferential groove. The coil is surrounded within the circumferential groove and extended along the axial groove.

14 Claims, 2 Drawing Sheets

(56) References Cited

U.S. PATENT DOCUMENTS

2007/0058892 A1 3/2007 Motohashi et al.
2008/0111541 A1* 5/2008 Miller ................. 324/207.16

FOREIGN PATENT DOCUMENTS

EP 0869365 A1 10/1998
TW 201041281 A1 11/2010

OTHER PUBLICATIONS

Liu et al., "Research on Combinatorial-Code Grating Eddy-Current Absolute-Position Sensor, Ieee Transactions on Instrumentation and Measurement," IEEE Trans. on Instrumentation and Measurement, vol. 61, No. 4, pp. 1113-1124 (Apr. 2012).

Oberle et al., "A 10 mW 2-Channel Fully Integrated System-on-Chip for Eddy-Current Position Sensing," Proceedings of the 27$^{th}$ European ESSCIRC 2001, pp. 125-128 (Sep. 2001).

Qi et al., "Multi-parameters Optimization and Nonlinearity Analysis of the Grating Eddy Current Displacement Sensor," IEEE Conf on Robotics, Automation & Mechatronics 2008, pp. 950-955 (Sep. 2008).

Himmel et al., "Diversification fo the Eddy Current Technology," 2010 7$^{th}$ IEEE Intl Multi-Conf on Systems, Signals & Devices, pp. 1-5 (2010).

Baker et al., "Performance Monitoring of a Machining Centre," IEEE Instrument & Measurement Tech Conf., pp. 853-858 (Jun. 1996).

"Comparing Capacitive and Eddy-Current Sensors," Lion Precision Tech Library, at http://www.lionprecision.com/tech-library/technotes/article-0011-cve.html, pp. 1-5 (2009).

* cited by examiner

MEASUREMENT DEVICE

This application claims the benefit of Taiwan application Serial No. 101145944, filed Dec. 6, 2012, the disclosure of which is incorporated by reference herein in its entirety.

TECHNICAL FIELD

The disclosure relates in general to a measurement device, and more particularly to a measurement device having multiple sensing elements.

BACKGROUND

Non-contact displacement sensor is a crucial element in the industrial rotor measurement system. Most displacement sensors are fixed on a base by screws. However, such assembly method often has large assembly error and leads to a decrease in measurement precision.

SUMMARY

The disclosure is directed to a measurement device.

According to one embodiment, a measurement device is provided. The measurement device comprises a ring-shaped base and a plurality of sensing elements. The sensing elements are symmetrically disposed on the ring-shaped base, and each sensing element comprises a circumferential groove, an axial groove and a coil. The axial groove is connected to the circumferential groove. The coil is surrounded within the circumferential groove and passes through the axial groove go out of the axial groove.

The above and other aspects of the disclosure will become better understood with regard to the following detailed description of the preferred but non-limiting embodiment(s). The following description is made with reference to the accompanying drawings.

Figure 1:
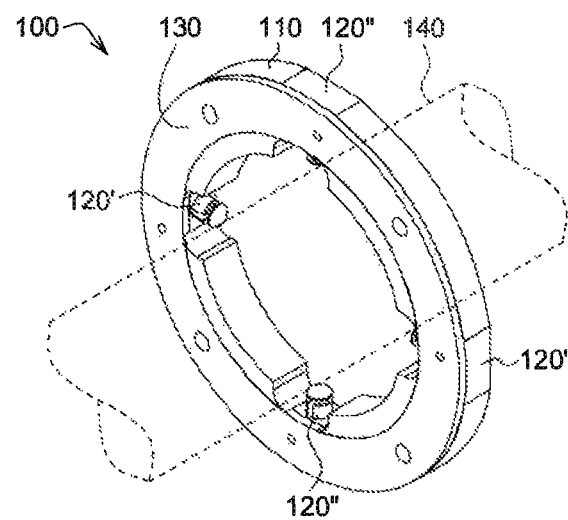
FIG. 1 shows an assembly diagram of a measurement device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, an assembly diagram of a measurement device according to an embodiment of the disclosure is shown. The measurement device 100 comprises a ring-shaped base 110, two symmetrical sensing elements 120', another two symmetrical sensing elements 120" and a ring-shaped circuit board 130. A shaft 140 passes through the ring-shaped base 110. When the shaft 140 rotates, the sensing elements 120' and 120" can measure displacement in two radial directions of the shaft 140 respectively.

Figure 2:
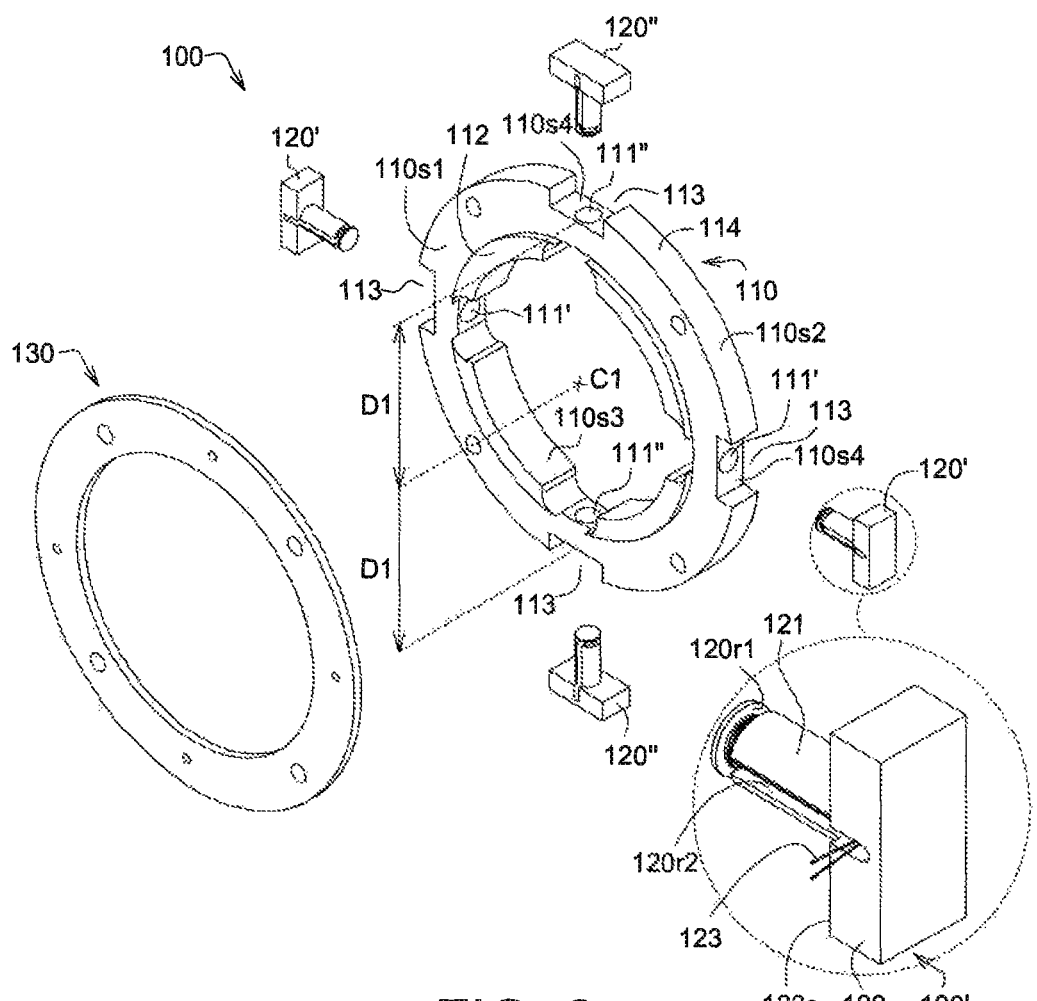
FIG. 2 shows an explosion diagram of a measurement device of FIG. 1.

Referring to FIG. 2, an explosion diagram of a measurement device of FIG. 1 is shown. The ring-shaped base 110 has four assembly holes 111' and 111", each of the assembly holes 111' and 111" radially penetrates the ring-shaped base 110. The quantity of assembly holes 111' and 111" is the same as that of the sensing elements 120' and 120". The sensing element 120' is inserted into the assembly hole 111', and the sensing element 120" is inserted into the assembly hole 111". Two assembly holes 111' are symmetrically formed on the ring-shaped base 110, such that the sensing elements 120' inserted therein are also disposed in a symmetrical manner. Another two assembly holes 111" are symmetrically formed on the ring-shaped base 110, such that the sensing elements 120" inserted therein are also disposed in a symmetrical manner. In the present embodiment, the two sensing elements 120' can measure displacement in one of the radial dimension of the shaft 140, and another two sensing elements 120" can measure displacement in the other one of the radial dimension of the shaft 140.

In the present embodiment, the quantity of sensing elements of the measurement device 100 is exemplified by two pairs. In another embodiment, the quantity of sensing elements can be one pair for measuring displacement in one single radial dimension of the shaft 140. In another embodiment, the quantity of sensing elements can be two or more than two pairs for measuring displacement in two radial dimensions of the shaft 140.

Two neighboring sensing elements 120' and 120" form an angle of 90 degrees with respect to the geometric center C1, such that the connecting line between two symmetrically sensing elements 120' is perpendicular to that between another two symmetrical sensing elements 120" for measuring displacement in two orthogonal radial directions of the shaft 140 (illustrated in FIG. 1).

Two symmetrically sensing elements 120' form one pair of differential sensing elements, and another two symmetrical sensing elements 120" form another pair of differential sensing elements, such that the influence on the sensing elements by temperature drift can be eliminated. In an embodiment, the sensing elements 120 and 120" are eddy-current sensing probe with high precision, high bandwidth and property impervious to surface cleanliness.

The ring-shaped base 110 comprises a radial surface 110s1, a protruding portion 112 and a ring-shaped body 114. The protruding portion 112 is disposed on the ring-shaped body 114 and projects from the radial surface 110s1, such that the ring-shaped circuit board 130 can be engaged with the outer edge of a side of the protruding portion 112.

The ring-shaped base 110 further has an outer circumferential surface 110s2, an inner circumferential surface 110s3 opposite to the outer circumferential surface 110s2 and four outer recesses 113. Each outer recess 113 is extended towards the inner circumferential surface 110s3 from the outer circumferential surface 110s2 without penetrating the ring-shaped base 110. Each of the sensing elements 120' and 120" is disposed in the corresponding outer recess 113. The sensing elements 120' and 120" can be tightly disposed in at least one of the outer recess 113 and the assembly hole (111' and 111"). For example, the sensing elements 120' and 120" can all be disposed in the outer recess 113 or the assembly holes 111' and 111". Alternatively, a part of the sensing elements 120' and 120" can be disposed in the outer recess 113, and another part can be disposed in the assembly hole 111' and/or 111". The present embodiment of the disclosure does not restrict the disposition of the sensing elements and any disposition would do as long as the two sensing elements 120' are disposed in a symmetric manner and another two sensing elements 120" are also disposed in a symmetric manner.

As indicated in FIG. 2, each of the sensing elements 120' and 120" comprises a stud 121 and a positioning portion 122, wherein the stud 121 is inserted into the corresponding assembly hole (111' and 111"). The positioning portion 122 is connected to the stud 121 and has a positioning surface 122s. The ring-shaped base 110 has a positioning surface 110s4. The assembly holes 111' and 111" penetrate the ring-shaped base 110 from the positioning surface 110s4 of the ring-shaped base 110. The positioning portion 122 is positioned on the positioning surface 110s4 of the ring-shaped base 110 by the positioning surface 122s. In the present embodiment, the positioning surface 122s of the positioning portion 122 fits the positioning surface 110s4 of the ring-shaped base 110. In another embodiment, the positioning surface 122s and the positioning surface 110s4 are curved surfaces matching each other.

The disposition positions of the sensing elements 120' and 120" are determined according to the distance D1 from the positioning surface 110s4 of the ring-shaped base 110 to the geometric center C1 of the ring-shaped base 110. In the present embodiment, the distance D1 from each positioning surface 110s4 of the ring-shaped base 110 to the geometric center C1 of the ring-shaped base 110 is substantially the same, such that the measurement precision of the sensing elements 120' and 120" can be increased.

Each of the sensing elements 120' and 120" has a circumferential groove 120r1, an axial groove 120r2 and a coil 123. The coil 123 is surrounded within the circumferential groove 120r1, and is extended along and passes through the axial groove 120r2. The circumferential groove 120r1 is formed at one end of the stud 121, and the axial groove 120r2 is extended to the positioning portion 122 from the circumferential groove 120r1, such that after the sensing elements 120' is disposed within the assembly hole 111', the sensing elements 120" is disposed within the assembly hole 111", and the axial groove 120r2 can be exposed outside the ring-shaped base 110 as indicated in FIG. 3.

Figure 3:
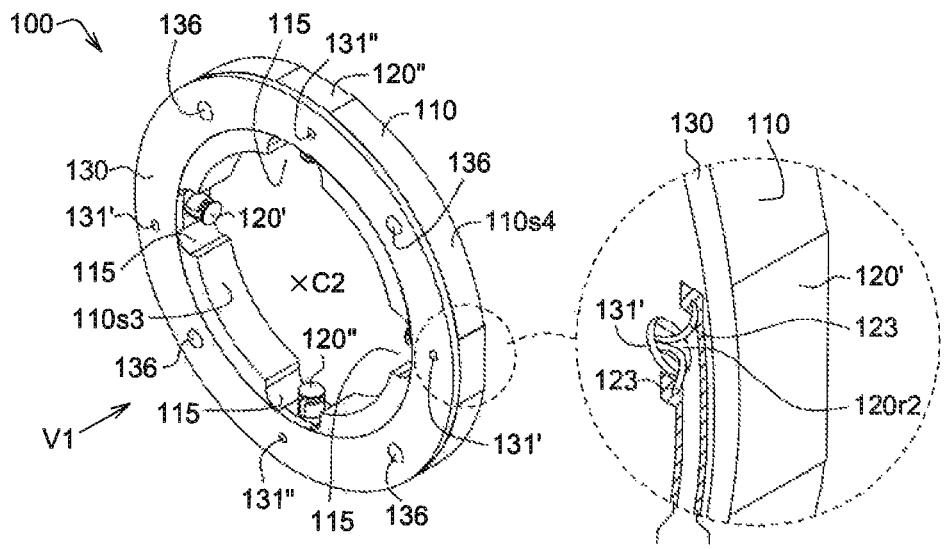
FIG. 3 shows an assembly diagram of a ring-shaped base and multiple sensing elements of FIG. 1.

Referring to FIG. 3, an assembly diagram of a ring-shaped base and multiple sensing elements of FIG. 1 is shown. After the sensing elements 120' is disposed in the assembly hole 111' and the sensing elements 120" is disposed in the assembly hole 111", the axial groove 120r2 is exposed outside the ring-shaped base 110. After the coil 123 passes through the exposed axial groove 120r2, the coil 123 is electrically connected to the ring-shaped circuit board 130.

The ring-shaped base 110 further has four inner recesses 115. Each inner recess 115 is extended towards the outer circumferential surface 110s4 from the inner circumferential surface 110s3 without penetrating the ring-shaped base 110. After the sensing elements 120' is disposed in the assembly hole 111' and the sensing elements 120" is disposed in the assembly hole 111", one end of each of the sensing elements 120' and 120" is disposed in the corresponding inner recess 115. The inner recesses 115 provides an isolation space, which avoids the coil 123 within the circumferential groove 120r1 of each of the sensing elements 120' and 120" being too close to the ring-shaped base 110 and affecting the distribution of the magnetic field generated by the coil 123.

In the present embodiment, the ring-shaped circuit board 130 has two outlet holes 131' and another two outlet holes 131". The two outlet holes 131' are symmetrically distributed with respect to the geometric center C2 of the ring-shaped circuit board 130, and another two outlet holes 131" are symmetrically distributed with respect to the geometric center C2 of the ring-shaped circuit board 130. After the ring-shaped circuit board 130 is disposed on the ring-shaped base 110, the two outlet holes 131' correspond to two sensing elements 120' and another two outlet holes 131" correspond to two sensing elements 120", such that the coil 123 surrounding the sensing elements 120' and 120" is exposed from the corresponding outlet hole 131' and 131" nearby and connected to the ring-shaped circuit board 130. After each coil 123 is exposed from the corresponding axial groove 120r2, the coil 123 passes through the corresponding outlet hole 131' or 131" and is electrically connected to the ring-shaped circuit board 130. Also, the ring-shaped circuit board 130 has four screw holes 136 through which the screws pass for locking the ring-shaped circuit board 130 on the ring-shaped base 110.

Figure 4:
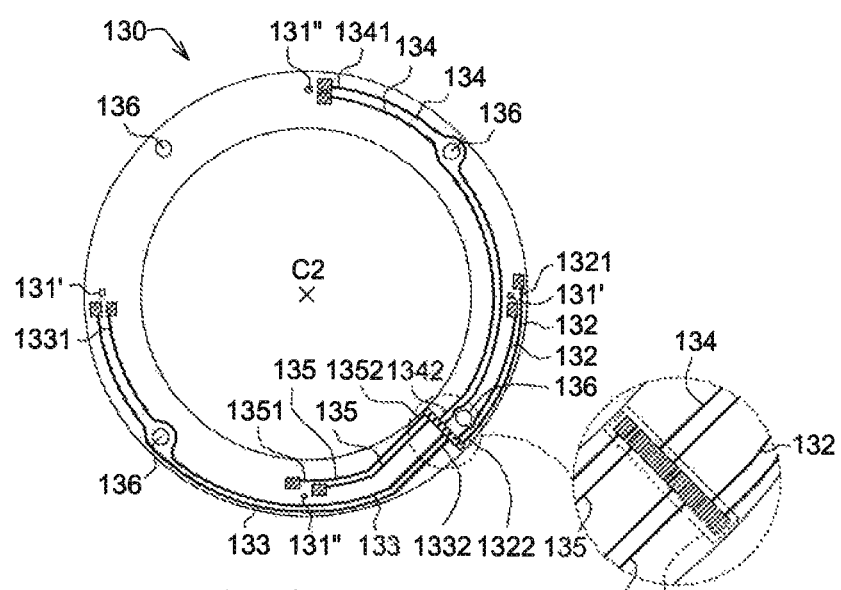
FIG. 4 shows a lateral view of a ring-shaped circuit board viewed along a direction V1 of FIG. 3.

Referring to both FIG. 3 and FIG. 4. FIG. 4 shows a lateral view of a ring-shaped circuit board viewed along a direction V1 of FIG. 3. The ring-shaped circuit board 130 comprises two first traces 132 and two second traces 133. One end 1321 of each first trace 132 is adjacent to one of the outlet holes 131, and one end 1331 of each second trace 133 is adjacent to the other one of the outlet holes 131'. The other end 1322 of each first trace 132 is adjacent to the other end 1332 of each second trace 133. Similarly, the ring-shaped circuit board 130 further comprises two third traces 134 and two fourth traces 135. One end 1341 of each third trace 134 is adjacent to one of the outlet holes 131", and one end 1351 of each fourth trace 135 is adjacent to the other one of the outlet holes 131". The other end 1342 of each third trace 134 is adjacent to the other end 1352 of each fourth trace 135. In the present embodiment, the other end 1322 of the first trace 132, the other end 1332 of the second trace 133, the other end 1342 of the third trace 134 and the other end 1352 of the fourth trace 135 are adjacent to each other (in a centralized manner), such that the same electrical connection piece 150 can be connected to the terminal points of all traces at one time. In comparison to the distributed distribution of traces, the design of centralized distribution of the present embodiment of the disclosure enables the electrical connection piece 150 to be connected to the terminal points of all traces by a smaller area. Here, the electrical connection piece is such as a flexible circuit board or other suitable electrical connection piece.

The quantities of sensing elements (120' and 120"), outer recesses 113, inner recesses 115 and assembly hole (111' and 111") are all exemplified by four pieces. In another embodiment, the quantities of sensing elements (120' and 120"), outer recesses 113, inner recesses 115 and assembly holes (111' and 111") can all be smaller or larger than four pieces, and are not limited to even numbers.

It will be apparent to those skilled in the art that various modifications and variations can be made to the disclosed embodiments. It is intended that the specification and embodiments be considered as exemplary only, with a true scope of the disclosure being indicated by the following claims and their equivalents.

What is claimed is:
1. A measurement device, comprising:
a ring-shaped base comprising a plurality of assembly holes symmetrically arranged around a circumferential surface of the ring-shaped base; and
a plurality of sensing elements, wherein each sensing element comprises:
a stud comprising a circumferential groove formed at a first end of the stud and
an axial groove connected to the circumferential groove and extending to a second end of the stud opposite the first end of the stud; and a coil wound within the circumferential groove and having coil leads passing through the axial groove to go out of the axial groove at the second end of the stud; wherein each stud is inserted into a corresponding one of the assembly holes of the ring-shaped base.

2. The measurement device according to claim 1, wherein each sensing element comprises a positioning portion connected to the second end of the stud and having a positioning surface for positioning the positioning portion on the ring-shaped base.

3. The measurement device according to claim 2, wherein each positioning surface is a plane or a curved surface.

4. The measurement device according to claim 1, wherein the ring-shaped base has a plurality of positioning surfaces, each assembly hole penetrating the ring-shaped base through a corresponding one of the positioning surfaces.

5. The measurement device according to claim 4, wherein any of the positioning surface of the positioning portion and the positioning surface of the ring-shaped base is a plane or a curved surface.

6. The measurement device according to claim 4, wherein a distance from each positioning surface of the ring-shaped base to a geometric center of the ring-shaped base is substantially the same.

7. The measurement device according to claim 2, wherein each axial groove is extended to the positioning portion from the circumferential groove and exposed outside the ring-shaped base, and the coil leads pass through the exposed axial grooves.

8. The measurement device according to claim 1, further comprising:
a ring-shaped circuit board disposed on the ring-shaped base.

9. The measurement device according to claim 8, wherein the ring-shaped circuit board has a plurality of outlet holes, and the coil leads of each coil pass through a corresponding one of the outlet holes and are electrically connected to the ring-shaped circuit board.

10. The measurement device according to claim 9, wherein the ring-shaped circuit board comprises two first traces and two second traces, one end of each first trace is adjacent to one of the outlet holes, one end of each second trace is adjacent to another one of the outlet holes, and the other end of each first trace is disposed adjacent to the other end of each second trace.

11. The measurement device according to claim 8, wherein the ring-shaped base comprises a radial surface and a protruding portion projecting from the radial surface, and the ring-shaped circuit board is engaged with the protruding portion.

12. The measurement device according to claim 1, wherein the ring-shaped base has an outer circumferential surface, an inner circumferential surface and a plurality of outer recesses, each outer recess is extended towards the inner circumferential surface from the outer circumferential surface without penetrating the ring-shaped base, and one end of each sensing element is disposed within a corresponding one of the outer recesses.

13. The measurement device according to claim 1, wherein the ring-shaped base has an outer circumferential surface, an inner circumferential surface and a plurality of inner recesses, each inner recess is extended towards the outer circumferential surface from the inner circumferential surface without penetrating the ring-shaped base, and one end of each sensing element is located within a corresponding one of the inner recesses.

14. The measurement device according to claim 1, wherein two of the sensing elements are symmetrically disposed on the ring-shaped based relative to each other, and another two of the sensing elements are symmetrically disposed on the ring-shaped based relative to each other.

* * * * *